(12) United States Patent
Letort

(10) Patent No.: US 10,988,221 B2
(45) Date of Patent: Apr. 27, 2021

(54) CONTROL DEVICE FOR POWER KITES

(71) Applicant: Régis André Paul Letort, Saint Père en Retz (FR)

(72) Inventor: Régis André Paul Letort, Saint Père en Retz (FR)

( * ) Notice: Subject to any disclaimer, the term of this patent is extended or adjusted under 35 U.S.C. 154(b) by 212 days.

(21) Appl. No.: 16/331,668

(22) PCT Filed: Jul. 7, 2017

(86) PCT No.: PCT/FR2017/000140
§ 371 (c)(1),
(2) Date: Mar. 8, 2019

(87) PCT Pub. No.: WO2018/046806
PCT Pub. Date: Mar. 15, 2018

(65) Prior Publication Data
US 2019/0193821 A1   Jun. 27, 2019

(30) Foreign Application Priority Data
Sep. 8, 2016 (FR) ........................ 1601325

(51) Int. Cl.
*B63H 8/16* (2020.01)
*B64C 31/06* (2020.01)
*B64C 31/036* (2006.01)

(52) U.S. Cl.
CPC ............. *B63H 8/16* (2020.02); *B64C 31/06* (2013.01); *B64C 31/036* (2013.01)

(58) Field of Classification Search
CPC .......... B63H 8/16; B64C 31/06; B64C 31/036
See application file for complete search history.

(56) References Cited

U.S. PATENT DOCUMENTS

| 2006/0226294 A1* | 10/2006 | Logosz | B63B 32/70 244/152 |
| 2007/0120016 A1* | 5/2007 | Eberle | B63H 8/16 244/153 R |
| 2008/0223989 A1* | 9/2008 | Mutzenberg | B63H 8/16 244/155 A |

FOREIGN PATENT DOCUMENTS

| FR | 2 820 401 A1 | 8/2002 |
| FR | 2 837 463 A1 | 9/2003 |
| FR | 2 937 300 A1 | 4/2010 |
| FR | 3 004 361 A1 | 10/2014 |

(Continued)

OTHER PUBLICATIONS

International Search Report, dated Oct. 19, 2017, from corresponding PCT/FR2017/000140 application.

(Continued)

*Primary Examiner* — Richard R. Green
*Assistant Examiner* — William L Gmoser
(74) *Attorney, Agent, or Firm* — Nixon & Vanderhye

(57) ABSTRACT

Disclosed is a control device for power kites. It consists of a tall Y-shaped structure, the base of which is connected to the center of a horizontal control bar arranged perpendicular to the structure. An articulation forms the connection between the base of the structure and the center of the horizontal control bar. The control lines for the leading edge and the control lines for the trailing edge of a power kite are attached to the front and rear pre-lines of the device. Compared to a standard kite bar, the disclosed control device makes it easier for the user to balance using very short lines.

8 Claims, 2 Drawing Sheets

(56) References Cited

FOREIGN PATENT DOCUMENTS

WO 2011/076270 A1 6/2011

OTHER PUBLICATIONS

Search Report and Written Opinion issued in French Patent Application No. 1601325 (with translation).

* cited by examiner

CONTROL DEVICE FOR POWER KITES

The present invention relates to a control device for power kites. This new device is made up of a tall Y-shaped structure, the base of which is connected, via an articulation, to the center of a horizontal control bar arranged perpendicular to the tall structure. The control lines for controlling a power kite are attached to the front and rear pre-lines provided on the device.

Compared to a standard kite bar, the control device according to the invention allows the user to balance more easily with very short lines, since the bearing on the control bar is greater.

The control device with four lines most commonly used to steer power kites is a horizontal gripping bar from about 40 cm to 60 cm.

The two control lines for the trailing edge of the kite are attached to the ends of the bar and the two control lines for the leading edge of the kite are attached to a single rope passing through an open part located at the center of the bar. The base of the single rope located below the bar includes a release loop attached to the user's harness. The control lines for the leading edge being fixed, the user pushes or pulls the bar in order to change the length of the control lines for the trailing edge so as to decrease (slacken) or increase (bring in) the power of the kite. To steer the latter, he tilts one of the sides of the control bar.

Another known control device is made up of two independent, bent, small vertical bars which the user holds in his hand. On each upper end of the small bars, a control line for the leading edge of a kite is attached and, on each lower end, a control line for the trailing edge of the kite is attached.

In Canada, a control device exists, that is primarily used on snow with specific kites and very short lines. This device is made up of a very long bar. The two lines for the leading edge of the kite are attached to the front of the bar and the two lines for the trailing edge to the rear. The user attaches to a fixed rope positioned at the front of the bar, behind the control lines for the leading edge of the kite.

Another device designed for kiteboarding with very short lines is made up of a central bar and two triangular wider ends. The front end of the bar includes a gripping handle. The lines for the trailing edge of a kite are connected to the ends of the rear wider part and the lines for the leading edge are attached just behind the front gripping handle. The user performs wrist movements to steer the kite and pushes or pulls the rear part of the device to bring in or slacken.

The control devices described above have several drawbacks.

A standard kite bar requires a certain length of lines to balance the boarder well, since it is the movement of the kite that creates the tension in the lines for the trailing edge and provides the necessary support for the user, in particular when winds are calm or irregular.

The average length of the lines is currently 23 m. With very short lines (e.g., 8 m to 12 m), the distance traveled by the kite in its flight window before being relaunched is insufficient to create strong and regular bearing on the control bar. Boarding will then be less pleasant and comfortable. The two small vertical bars, commonly called "handles", have the same drawback as the standard bar, and the support is even less significant due to the two independent parts.

The control bar for the Paraskiflex practiced in Canada and the device having wider parts in front and back provide the necessary support to balance the boarder with very short lines, since the control lines for the leading edge and the trailing edge of the kite are separated by a rigid bar on which the border can bear, like a windsurfing wishbone.

The major problem with this type of bar is related to the steering of the kite, which is less pleasant, lower performing and less instinctive than that of a standard kite bar. Furthermore, the bringing in/slackening system is less effective and the user must change the direction of the device with each tack change.

The device according to the invention makes it possible to resolve the aforementioned drawbacks. It provides the necessary support for the user to practice kite with very short lines owing to the rigid structure that separates the control lines for the leading edge of the kite from the lines for the trailing edge, and is handled like a standard kite bar. The user raises or lowers the horizontal control bar to slacken or bring in and tilts it to one side or the other to steer the kite.

Kiteboarding with this device equipped with very short lines limits the amplitude of untimely embarkments owing to the shorter flight window. Furthermore, it has several other advantages, for example an easier learning, a more direct control of the kite, shorter and smoother sequences of curves, a limited bulk on narrow or overpopulated spots or the possibility of setting down or taking off its kite easily without assistance as well as an easier control of the kite in irregular wind. The various disciplines such as kitesurfing, kite skiing, mountain boarding or kite boating are thus more accessible to the general public.

The invention relates to a control device for power kites, characterized in that it is made up of a tall structure constituted, for example, by an assembly of tubes forming a "Y".

The base of the structure is connected to the center of a horizontal control bar, arranged perpendicular to the structure. An articulation forms the connection between the base of the structure and the center of the aforementioned control bar, which allows the latter to act as a lever bearing on a fixed point located at the center thereof, such that lowering one of its sides causes the other to be raised.

The end of a rear pre-line is attached to one side of the lower control bar, the central part of the pre-line passes through a ring positioned behind the tall structure, then its other end is attached to the opposite side of the control bar.

The control lines for the trailing edge of the kite are connected to ropes provided on each side of the rear pre-line. The front end of the Y-shaped structure includes a guide crossed by the front pre-line. The control lines for the leading edge of the kite are connected to the upper part of the aforementioned pre-line. A clam cleat and a stop are attached to the pre-line in its middle part just below the front branch of the structure. The upper part of the pre-line passes through a pulley mounted on a lined rope, provided to attach the control lines for the leading edge of the kite. The pre-line then goes down again to pass through the aforementioned guide again, and then through the stop and the clam cleat, which makes it possible to change the length of the front pre-line in order to adjust the power of the kite. The lower part of the pre-line is connected to a release loop intended to be attached to the user's harness.

According to specific embodiments, the control device includes the following features:
- the tall structure of the device includes oblique upper branches.
- an articulation may form the connection between the base of the structure and the center of a horizontal control bar arranged perpendicular to the structure.

the lower ends of the control lines for the trailing edge of a power kite can be connected to ropes provided on each side of the rear pre-line.

the central part of the rear pre-line can pass through a ring positioned at the rear end of the tall structure and the ends of the pre-line can be attached on each side of the lower control bar.

the front part of the Y-shaped structure can include a guide crossed by a pre-line attaching, in its upper part, the control lines for the leading edge of a power kite.

a traditional system for adjusting the power of the kite can be provided on the front pre-line.

a stop, located below the front guide of the tall structure, can be placed on the pre-line.

a release loop of the kite intended to be connected to the user's harness can be attached to the lower end of the front pre-line.

long semi-rigid sheaths can partially enclose the rear pre-line.

protective enclosures can cover the tall structure and the articulation.

The invention will be better understood upon reading the following description, provided solely as non-limiting examples and done in reference to the accompanying drawings.

Figure 1:
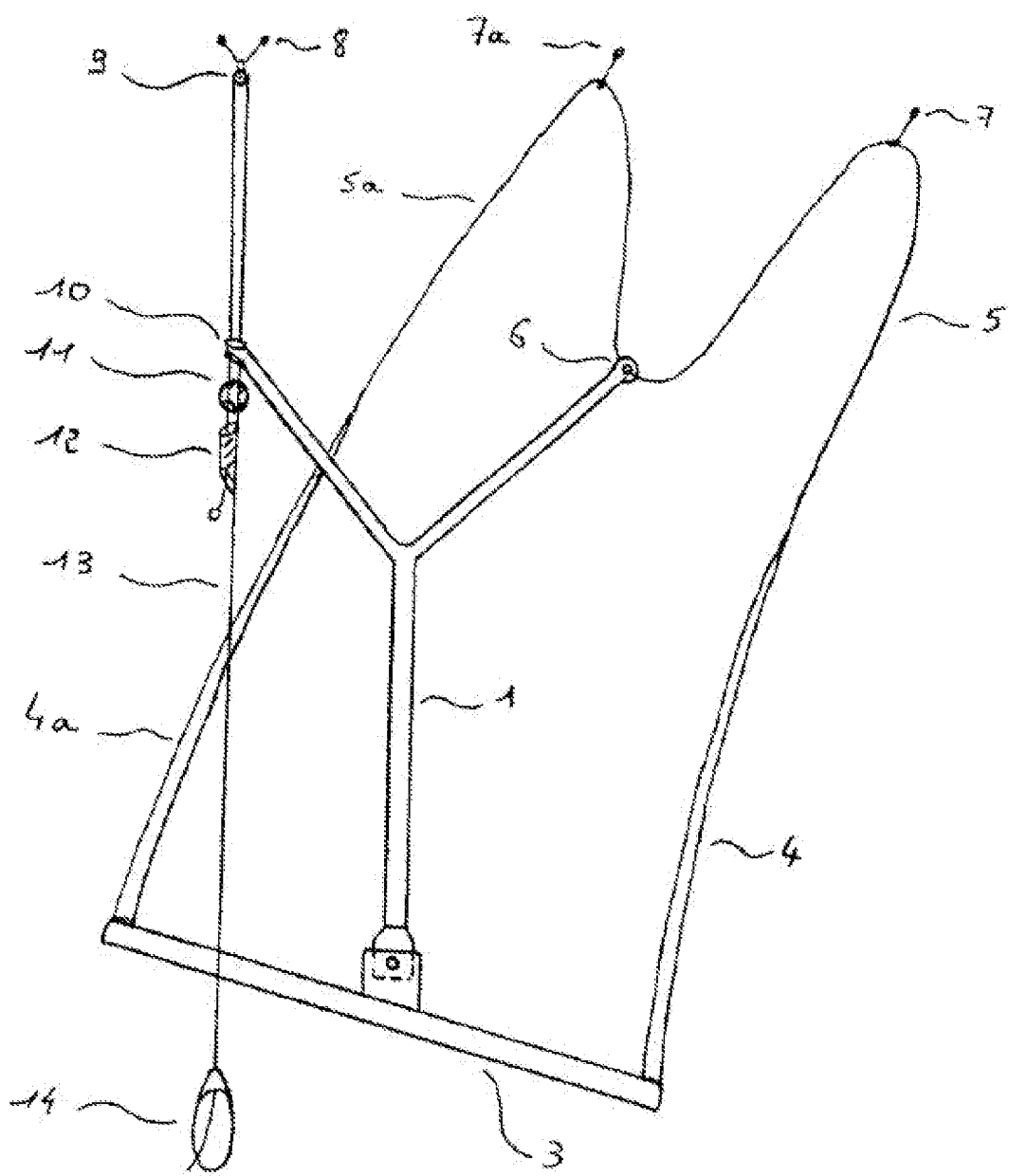
FIG. 1 shows the control device in perspective view.

In reference to these drawings, the control device of FIG. 1 is made up of a vertical Y-shaped tall structure (1) formed, for example, by an assembly of tubes made from carbon, aluminum or fiberglass, etc. The oblique positioning, in a V shape, of the upper branches of the structure (1) limits the risk of blocking or kinking of the pre-lines (5); (5a); (13) below or around the branches of the structure (1).

The base of the structure (1) is connected, via an articulation (2), to the center of a horizontal control bar (3) arranged perpendicular to the tall structure (1). The articulation (2) allows the horizontal control bar (3) to perform a tilting movement such that lowering one of its sides causes the other side to be raised. Each end of a rear pre-line (5); (5a) is connected to one end of the control bar (3). The central part of the pre-line (5); (5a) passes through a ring (6) positioned at the rear end of the structure (1). Ropes (7); (7a) provided on each side of the pre-line (5) (5a) make it possible to attach the base of the control lines for controlling a power kite. Semi-rigid sheaths (4); (4a) cover the lower and middle part of the rear pre-line (5); (5a).

The front end of the Y-shaped structure (1) includes a guide (10) crossed by a second pre-line (13) that attaches, in its upper part, the lines for the leading edge of the kite. The lower end of the pre-line (13) includes a release loop (14) intended to be attached to the user's harness. A clam cleat (12) and a stop (11) are attached to the middle part of the pre-line (13), below the front branch of the structure (1). The pre-line (13) passes through the aforementioned guide (10), then passes through an upper pulley (9), topped by a lined rope (8) making it possible to attach the control lines for the leading edge of the kite (13), and next goes back down to pass again through the guide (10), and then through the stop (11) and the clam cleat (12).

The user can thus adjust the power of the kite by changing the length of the front pre-line (13).

Figure 2:
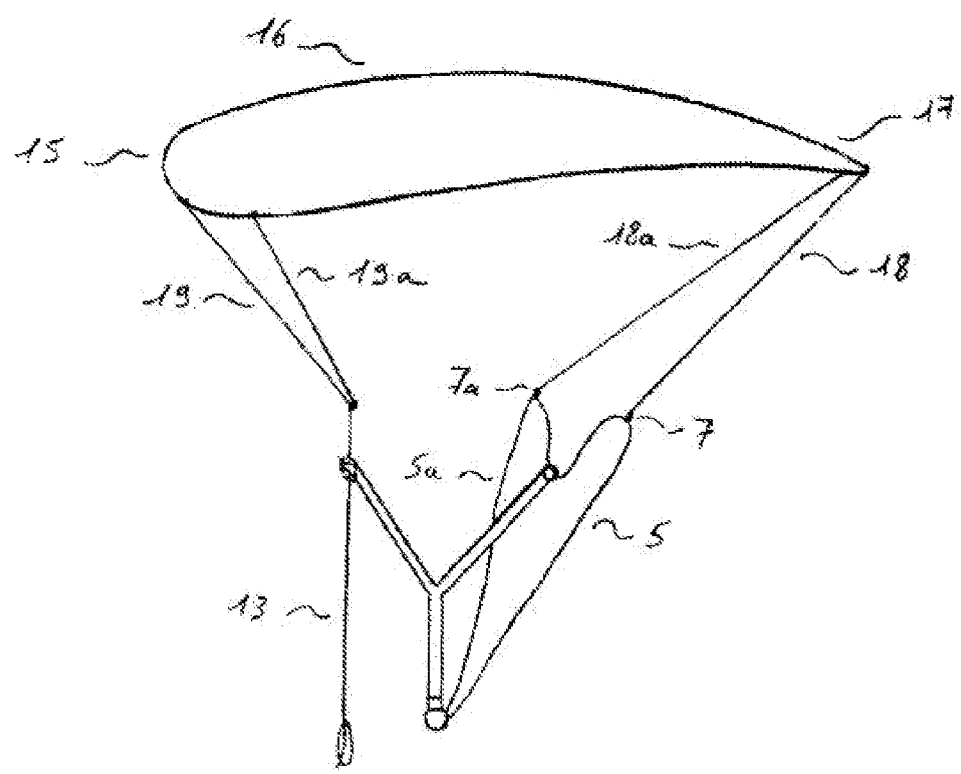
FIG. 2 shows the profile of the control device connected to a power kite.

FIG. 2 shows the profile of the control device connected to a power kite (16). The bases of the control lines (19); (19a) for the leading edge (15) of the kite (16) are attached to the upper end of the front pre-line (13) and the bases of the control lines (18); (18a) for the trailing edge (17) of the kite (16) are attached to the ropes (7); (7a) provided on each side of the rear pre-line (5); (5a).

Figure 3:
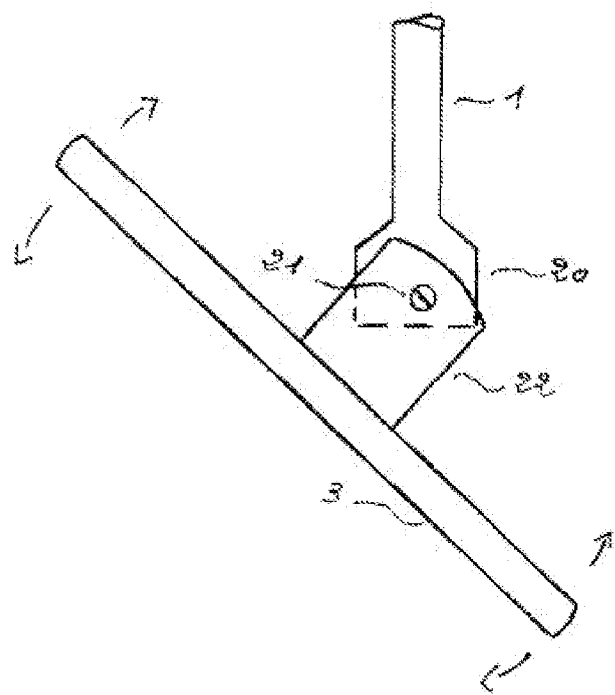
FIG. 3 is a view of the articulation forming the connection between the base of the tall structure and the center of the lower control bar.

FIG. 3 shows the articulation forming the connection between the base of the tall structure (1) and the central part of the control bar (3). The lower end (20) of the structure (1) is widened and flattened, then inserted into the yoke (22) attached to the center of the control bar (3). An axle (21) passes through the yoke (22) and the widened lower end (20) of the structure (1). The axle (21) constitutes a fixed point for allowing the tilting of the control bar (3), such that lowering one of its sides causes the other to be raised so as to steer the kite like a traditional kite bar. In order to limit the bulk of the device for example for transport or storage thereof, the control bar (3) can be positioned vertically along the structure (1) owing to the significant height of the yoke (22) allowing it to tilt with a considerable amplitude.

The present invention is not limited to the embodiments previously described; for example, several folding or disassembly systems can be adapted.

The vertical system or the articulation can have different shapes or be replaced with similar elements having the same functions.

In general, various changes can be made without departing from the scope of the invention. The control device is relevant to the manufacturers of accessories for power kites.

The invention claimed is:

1. A control device for a power kite, wherein the control device is formed by a vertical structure topping a horizontal control bar arranged perpendicular to said structure, an articulation forms the connection between a center of the control bar and a base of the structure, each end of a rear pre-line is connected to one end of the control bar, a central part of the pre-line passes through a ring positioned at a rear end of the structure, control lines for a trailing edge of the power kite are connected to attachment points provided on each side of the rear pre-line and control lines for a leading edge of the power kite are connected to an upper end of a front pre-line situated at a front of the structure, a guide positioned at the front of the structure is crossed by the front pre-line, a lower part of the front pre-line is intended to be connected to the user.

2. The control device according to claim 1, wherein the control bar acts as a lever bearing on an axle located at the center of the control bar, such that lowering one of the sides of the control bar causes the other side of the control bar to be raised.

3. The control device according to claim 1, wherein the control bar acts as a lever bearing on a fixed point located at the center of the control bar, such that lowering one of the sides of the control bar causes the other side of the control bar to be raised.

4. The control device according to claim 1, wherein the structure have upper branches that are oblique.

5. The control device according to claim 1, wherein a stop is placed on the front pre-line, just below the guide positioned at the front end of the structure.

6. The control device according to claim 1, wherein semi-rigid sheaths partially enclose the rear pre-line.

7. The control device according to claim 2, wherein the base of the structure is widened and flattened and is inserted into a yoke attached to the center of the control bar and kept in place by the axle.

8. The control device according to claim 5, wherein a means for adjusting the power of the kite is provided on the front pre-line, below the aforementioned guide.

\* \* \* \* \*